US010625753B2

(12) United States Patent
Yoshii et al.

(10) Patent No.: US 10,625,753 B2
(45) Date of Patent: Apr. 21, 2020

(54) SELF-DRIVING VEHICLE

(71) Applicant: Yamaha Motor Power Products Kabushiki Kaisha, Shizuoka (JP)

(72) Inventors: Yoshinori Yoshii, Shizuoka (JP); Takahiro Nakamura, Shizuoka (JP); Akihisa Tominaga, Shizuoka (JP); Nobuya Ishikawa, Shizuoka (JP)

(73) Assignee: YAMAHA MOTOR POWER PRODUCTS KABUSHIKI KAISHA, Shizuoka-Ken (JP)

( * ) Notice: Subject to any disclaimer, the term of this patent is extended or adjusted under 35 U.S.C. 154(b) by 372 days.

(21) Appl. No.: 15/853,929

(22) Filed: Dec. 25, 2017

(65) Prior Publication Data
US 2018/0257667 A1    Sep. 13, 2018

(30) Foreign Application Priority Data

Mar. 8, 2017 (JP) ................... 2017-044048

(51) Int. Cl.
*B60W 50/10* (2012.01)
*B60W 30/16* (2020.01)
(Continued)

(52) U.S. Cl.
CPC ............ *B60W 50/10* (2013.01); *B60W 10/18* (2013.01); *B60W 10/20* (2013.01); *B60W 30/10* (2013.01); *B60W 30/16* (2013.01); *B60W 50/082* (2013.01); *B60W 50/12* (2013.01); *G05D 1/0259* (2013.01); *B60W 2300/40* (2013.01);
(Continued)

(58) Field of Classification Search
CPC ...... B60W 50/10; B60W 30/16; B60W 30/10; B60W 50/082; B60W 10/18; B60W 10/20; B60W 50/12; B60W 2556/45; B60W 2300/40; B60W 2520/10; B60W 2540/18; B60W 2540/12; B60W 2540/10;
(Continued)

(56) References Cited

U.S. PATENT DOCUMENTS 4,561,527 A * 12/1985 Nakamoto ................ B60T 7/12
188/2 D
5,251,680 A * 10/1993 Minezawa ............ B60L 3/0007
180/169

(Continued)

FOREIGN PATENT DOCUMENTS

JP    H02-263213 A    10/1990
JP    H04-321107 A    11/1992
(Continued)

*Primary Examiner* — Frederick M Brushaber
(74) *Attorney, Agent, or Firm* — HEA Law PLLC

(57) ABSTRACT

A self-driving vehicle includes a plurality of operation members for the driver to operate and a controller. The plurality of operation members includes a steering operation member, a brake operation member, and an accelerating operation member. The controller has, as control modes thereof, an automatic operation mode and a manual operation mode. The operation member that is predefined as a trigger for the shift from the automatic operation mode to the manual operation mode differs depending on states of the vehicle in the automatic operation mode. The self-driving vehicle enables the driver to shift the control mode from the automatic operation mode to the manual operation mode with a simple operation.

13 Claims, 10 Drawing Sheets

(51) Int. Cl.
*B60W 30/10* (2006.01)
*B60W 50/08* (2020.01)
*G05D 1/02* (2020.01)
*B60W 10/18* (2012.01)
*B60W 10/20* (2006.01)
*B60W 50/12* (2012.01)
*G05D 1/00* (2006.01)

(52) U.S. Cl.
CPC ..... *B60W 2520/10* (2013.01); *B60W 2540/10* (2013.01); *B60W 2540/12* (2013.01); *B60W 2540/18* (2013.01); *B60W 2556/45* (2020.02)

(58) Field of Classification Search
CPC ......... G05D 1/0259; G05D 2201/0204; G05D 1/0061; G05D 1/0265
See application file for complete search history.

(56) References Cited

U.S. PATENT DOCUMENTS

| | | | |
|---|---|---|---|
| 6,332,654 B1 * | 12/2001 | Yano | B60T 7/122 188/353 |
| 6,699,155 B2 * | 3/2004 | Nagasaka | F16H 59/0204 192/220 |
| 8,565,997 B2 | 10/2013 | Kindo et al. | |
| 9,008,887 B2 | 4/2015 | Kindo et al. | |
| 9,342,074 B2 | 5/2016 | Dolgov et al. | |
| 9,506,558 B2 | 11/2016 | Fujiyoshi et al. | |
| 9,623,906 B2 * | 4/2017 | Rohlfs | B62D 15/028 |
| 2011/0054739 A1 * | 3/2011 | Bammert | B62D 15/028 701/41 |
| 2016/0207527 A1 | 7/2016 | Hiei et al. | |

FOREIGN PATENT DOCUMENTS

| | | |
|---|---|---|
| JP | H07-61356 A | 3/1995 |
| JP | 2004-203117 A | 7/2004 |
| JP | 2010-264829 A | 11/2010 |
| JP | 4684638 B2 | 5/2011 |
| JP | 2011-167521 A | 9/2011 |
| JP | 2012-051441 A | 3/2012 |
| JP | 2015-48034 A | 3/2015 |
| JP | 2016-099713 A | 5/2016 |
| JP | 2016-522769 A | 8/2016 |
| JP | 2016-199104 A | 12/2016 |

* cited by examiner

FIG.6

| STATE | ACCELERATOR PEDAL | BRAKE PEDAL | STEERING WHEEL |
|---|---|---|---|
| VEHICLE STOP STATE | ◯ | × | × |
| START OPERATION PERFORMING STATE | ◯ | ◯ | ◯ |
| VEHICLE RUNNING STATE | ◯ | ◯ | ◯ |
| STOP OPERATION PERFORMING STATE (FIRST STAGE) | ◯ | × | ◯ |
| STOP OPERATION PERFORMING STATE (SECOND STAGE) | ◯ | × | × |
| SLOPE DESCENT STATE | ◯ | ◯ | ◯ |

FIG.10
(a) 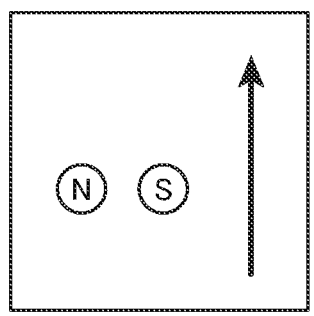  (b) 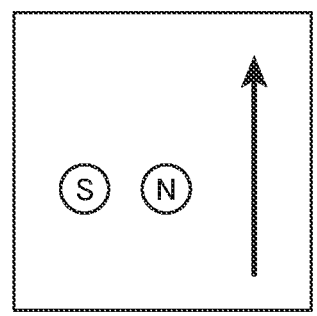  (c) 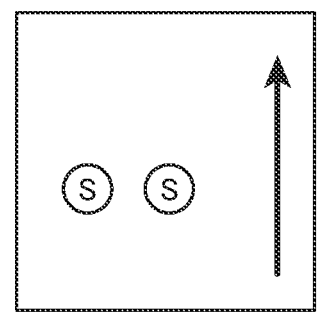

SELF-DRIVING VEHICLE

CROSS-REFERENCE TO RELATED APPLICATION

The present application claims priority from Japanese application JP 2017-044048 filed on Mar. 8, 2017, the entire content of which is hereby incorporated by reference into this application.

BACKGROUND

1. Field of the Invention

The present invention relates to a self-driving vehicle running along an induction line installed along a running course.

2. Description of the Related Art

Conventionally, self-driving vehicles that run automatically along an induction line laid in a running course are used. A vehicle disclosed in Japanese Patent Publication No. H07-61356 has an automatic operation mode and a manual operation mode as its control modes. In the automatic operation mode, the front wheels that are steered wheels, the engine that is a drive source, and the brake devices are controlled by a controller without depending on operation of the driver so that the vehicle runs along the induction line. In the manual operation mode, the drive source and the like are controlled according to operations of the operation members (specifically, the steering operation member, the accelerating operation member, and the brake operation member) by the driver. The self-driving vehicle includes an operation button for the driver to shift the control mode between the automatic operation mode and the manual operation mode.

SUMMARY

In some cases, drivers are required to move the vehicle to a position away from the induction line while running in the automatic operation mode. In these cases, the control mode is required to shift from the automatic operation mode to the manual operation mode. In these cases, it is necessary for the driver of the conventional vehicle to press the operation button to switch the control mode from the automatic operation mode to the manual operation mode. However, it may be troublesome for the driver to find and press the operation button.

To address these drawbacks, the present application proposes a self-driving vehicle that can shift from the automatic operation mode to the manual operation mode with a simpler operation.

An embodiment of the self-driving vehicle according to the present application includes: a plurality of operation members for a driver to operate, the operation members including a steering operation member, a brake operation member, and an accelerating operation member; a sensor that detects an induction line installed along a running course; and a controller having, as control modes thereof, an automatic operation mode and a manual operation mode. The controller controls, in the automatic operation mode, the vehicle based on output of the sensor so that the vehicle runs along the induction line. The controller allows, in the manual operation mode, the vehicle to run and stop in accordance with the operation of the plurality of the operation members by the driver. The controller shifts from the automatic operation mode to the manual operation mode upon a trigger of operation of a predefined operation member among the plurality of the operation members. The operation member that is predefined as the trigger for the shift from the automatic operation mode to the manual operation mode differs depending on different states of the vehicle in the automatic operation mode.

The above described embodiment enables the driver to shift the control mode from the automatic operation mode to the manual operation mode with a more simple operation than that of the conventional vehicle that requires the driver to find and press the operation button, when shifting from the automatic operation mode to the manual operation mode. Specifically, the driver is allowed to shift the control mode from the automatic operation mode to the manual operation mode by operating an operation member that is defined corresponding to the state of the vehicle, and the operation member is operated after shifting to the manual operation mode. It is unnecessary for the driver to perform a special operation for shifting from the automatic operation mode to the manual operation mode.

In the self-driving vehicle described above, in a vehicle stop state in the automatic operation mode, the controller may shift from the automatic operation mode to the manual operation mode upon a trigger of operation of the accelerating operation member. In a vehicle running state in the automatic operation mode, the controller may shift from the automatic operation mode to the manual operation mode upon a trigger of operation of any one of the steering operation member, the brake operation member, and the accelerating operation member. This configuration enables the driver to shift the control mode in the vehicle stop state in the automatic operation mode by operating the accelerating operation member that is operated by the driver, after shifting to the manual operation mode, and to immediately start running the vehicle in the manual operation mode.

The self-driving vehicle described above may include a first brake device that automatically starts working under a control of the controller when the vehicle transitions into the vehicle stop state, and then maintains the vehicle in the vehicle stop state. The controller may shift from the automatic operation mode to the manual operation mode upon a trigger of operation of the accelerating operation member in the vehicle stop state where the first brake device works, and then release braking of the first brake device. This configuration can reduce the operational burden on the driver and maintain the vehicle in the vehicle stop state because the first brake device automatically starts working under a control of the controller when the vehicle transitions into the vehicle stop state in the automatic operation mode. Further, this configuration enables the driver to shift the control mode by operating the accelerating operation member even in the vehicle stop state where the first brake device is working, and then to immediately start running the vehicle in the manual operation mode.

In the self-driving vehicle described above, the controller may not shift from the automatic operation mode to the manual operation mode upon a trigger of operation of any one of the steering operation member and the brake operation member in the vehicle stop state in the automatic operation mode. This configuration prevents an unnecessary shifting of the control mode.

In the self-driving vehicle described above, the controller may shift from the automatic operation mode to the manual operation mode upon a trigger of operation of any one of the steering operation member, the brake operation member, and the accelerating operation member in a vehicle running state in the automatic operation mode. Further, after a predefined stop condition is satisfied during running in the automatic operation mode, the controller may shift from the automatic operation mode to the manual operation mode upon a trigger of operation of any one of the steering operation member and the accelerating operation member. This configuration enables the driver to shift the control mode by operating the accelerating operation member that is operated after shifting to the manual operation mode, after the stop condition is satisfied during running in the automatic operation mode, and then to immediately start running the vehicle in the manual operation mode. Further, this configuration enables the driver to shift the control mode by operating the steering operation member that is operated after shifting to the manual operation mode, after the stop condition is satisfied during running in the automatic operation mode, and then to immediately change the running direction of the vehicle to a direction which deviates from the induction line. As a result, the vehicle can avoid an obstacle on the induction line.

In the self-driving vehicle described above, after the stop condition is satisfied during running in the automatic operation mode, and until the vehicle transitions into the vehicle stop state in the automatic operation mode, the controller may shift from the automatic operation mode to the manual operation mode upon a trigger of operation of any one of the steering operation member and the accelerating operation member. In a situation where the vehicle runs at a low speed in a period after the stop condition is satisfied during running in the automatic operation mode and until the vehicle transitions into the vehicle stop state in the automatic operation mode, this configuration enables the driver to shift the control mode by operating the accelerating operation member and then to start running the vehicle. Further, in that situation, this configuration enables the driver to shift the control mode by operating the steering operation member and then to change the running direction of the vehicle. As a result, the vehicle can avoid an obstacle on the induction line.

In the self-driving vehicle described above, after the stop condition is satisfied during running in the automatic operation mode, the controller may not shift from the automatic operation mode to the manual operation mode upon a trigger of operation of the brake operation member. This configuration prevents an unnecessary shifting of the control mode.

The self-driving vehicle described above may include a first brake device that automatically starts working under a control of the controller when the vehicle transitions into a vehicle stop state in the automatic operation mode and then maintains the vehicle in the vehicle stop state, and a second brake device that slows down the vehicle. Before the second brake device starts slowing down the vehicle in the automatic operation mode, the controller may shift from the automatic operation mode to the manual operation mode upon a trigger of operation of any one of the steering operation member, the brake operation member, and the accelerating operation member. In a period after the second brake device starts slowing down the vehicle in the automatic operation mode and until the first brake device automatically starts working, the controller may shift from the automatic operation mode to the manual operation mode upon a trigger of operation of any one of the steering operation member and the accelerating operation member. In the period after the second brake device starts slowing down the vehicle in the automatic operation mode and until the first brake device automatically starts working, this configuration enables the driver to shift the control mode by operating the accelerating operation member that is operated after shifting to the manual operation mode and then to immediately start running the vehicle in the manual operation mode. Further, in the period, this configuration enables the driver to shift the control mode by operating the steering operation member that is operated after shifting to the manual operation mode and then to immediately change the running direction of the vehicle to a direction which deviates from the induction line. As a result, the vehicle can avoid an obstacle on the induction line.

In the self-driving vehicle described above, in the period after the second brake device starts slowing down the vehicle in the automatic operation mode and until the first brake device automatically starts working, the controller may not shift from the automatic operation mode to the manual operation mode upon a trigger of operation of the brake operation member. This configuration prevents an unnecessary shifting of the control mode.

The self-driving vehicle described above may further include a steered wheel. The steering operation member may be interlocked with the steered wheel and be positioned at a rotation angle corresponding to orientation of the steered wheel. The controller may control the orientation of the steered wheel based on a relative position between the induction line and the vehicle in the automatic operation mode, and the controller may limit change of the orientation of the steered wheel at a start time of running the vehicle in the automatic operation mode. At the start time of running of the vehicle in the automatic operation mode, this configuration can prevent a rapid increase of the rotation speed of the steering operation member due to large deviations in the position and the orientation of the vehicle from the induction line. As a result, comfortable driving is provided to the driver.

In the self-driving vehicle described above, the controller may determine the start time of running based on speed of the vehicle.

The self-driving vehicle described above may further include a start instruction operation member for the driver to instruct the controller to start running the vehicle in the automatic operation mode. The controller may determine the start time of running based on operation of the start instruction operation member.

In the self-driving vehicle described above, in a vehicle running state in the automatic operation mode, the controller may shift from the automatic operation mode to the manual operation mode upon a trigger of operation of the steering operation member. According to the present embodiment, when the driver instructs the controller to start running the vehicle while gripping the steering operation member, the control mode can be shifted from the automatic operation mode to the manual operation mode immediately after the vehicle starts running. As a result, this configuration can more effectively prevent a rapid increase of the rotation speed of the steering operation member.

BRIEF DESCRIPTION OF THE DRAWINGS

The above and other objects and advantages will be more apparent from the following description and drawings in which:

FIG. 6 is a table for explaining an example of requirements of node shift from the automatic operation mode to the manual operation mode;

FIG. 10 is a diagram showing an example of magnets installed in a running course.

DETAILED DESCRIPTION

The terminology used herein is for the purpose of describing particular embodiments only and is not intended to be limiting of the invention. As used herein, the term "and/or"0 includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, processes, steps, operations, elements, and/or components, but do not preclude the presence or addition of one or more other features, processes, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing embodiments of the invention, it will be understood that several designs and steps are disclosed. Each of these designs has individual benefits and each can also be used in conjunction with one or more, or in some cases all, of the other disclosed designs. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 1:
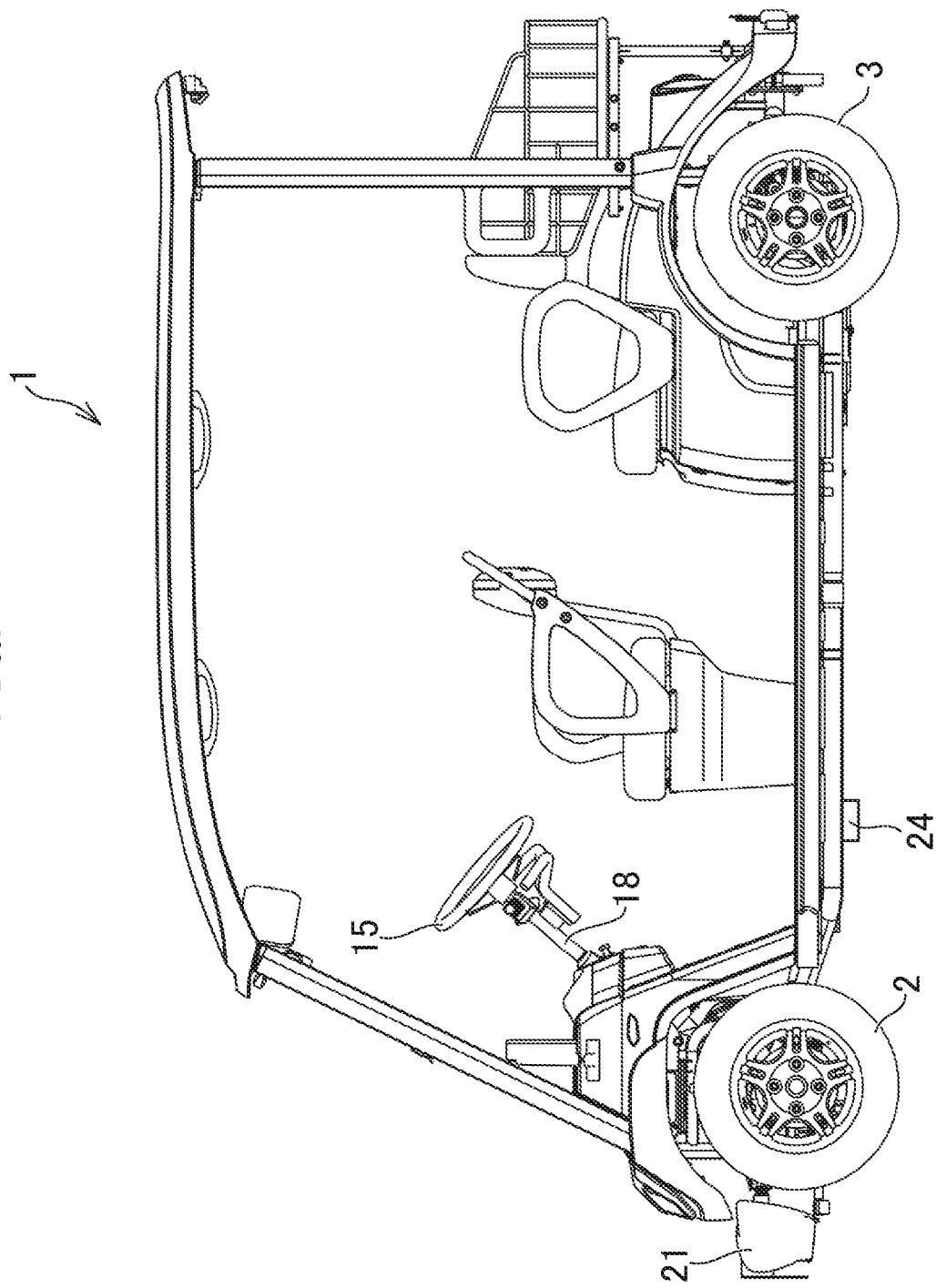
FIG. 1 is a side view of a self-driving vehicle described in several embodiments.
Figure 2:
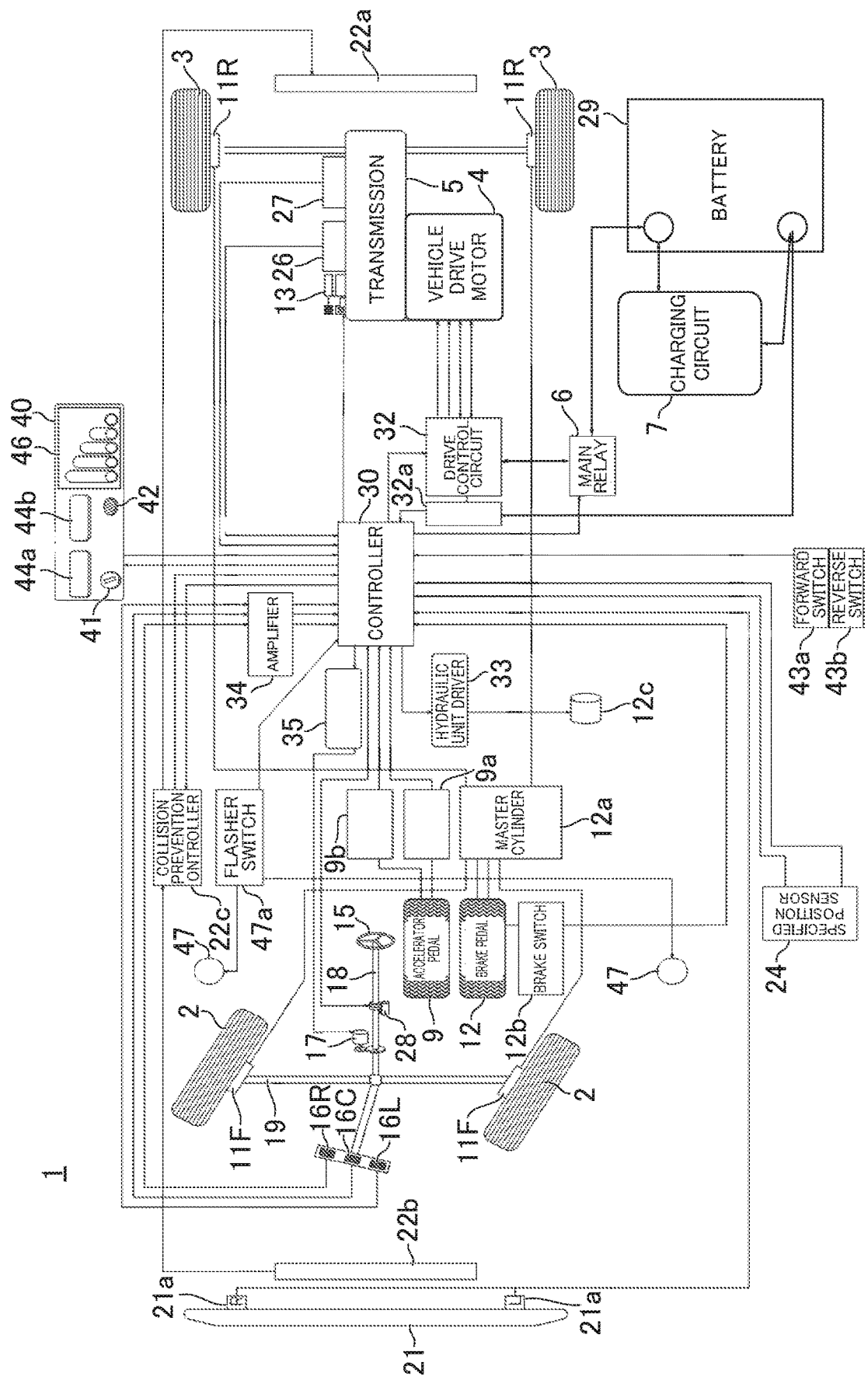
FIG. 2 is a diagram showing an example of a system configuration of the self-driving vehicle shown in FIG. 1.

The present invention will now be described by referencing the appended figures representing embodiments. FIG. 1 is a side view of a self-driving vehicle 1 that is an example of embodiments according to this invention. FIG. 2 is a diagram showing a system configuration of the self-driving vehicle 1.

System Configuration

As shown in FIG. 2, the self-driving vehicle 1 (hereinafter referred to as "vehicle 1") includes left and right front wheels 2 that are steered wheels and left and right rear wheels 3 that are drive wheels. The vehicle 1 includes, for example, a vehicle drive motor 4 as a drive source for driving the rear wheels 3. Unlike the example of the vehicle 1, the torque of the vehicle drive motor 4 may be transmitted to the front wheels 2 or both of the front wheels 2 and the rear wheels 3. In still another example, the vehicle 1 may include an engine as the drive source. The rear wheels 3 may also function as the steered wheels.

As shown in FIG. 2, the vehicle 1 includes a battery 29, a controller 30, and a drive control circuit 32. The controller 30 includes a CPU (Central Processing Unit), a memory, and the like. When the vehicle 1 is running, the drive control circuit 32 receives electric power from the battery 29 to supply electric power corresponding to a command value received from the controller 30 to the vehicle drive motor 4. Specifically, the drive control circuit 32 supplies electric current corresponding to an electric current command value received from the controller 30 to the motor 4. The drive control circuit 32 includes a power transistor controlled by a signal from the controller 30 and outputs electric power corresponding to the command value by driving the transistor. The vehicle 1 includes an electric current detection circuit 32a for detecting the electric current supplied from the drive control circuit 32 to the vehicle drive motor 4. The controller 30 detects an output torque of the vehicle drive motor 4 based on an output signal of the electric current detection circuit 32a. The battery 29 is connected to the drive control circuit 32 via a main relay 6 that is switched between an ON state and an OFF state by the controller 30. Further, the vehicle 1 includes a charging circuit 7 for charging the battery 29 with electric power supplied from an external power supply.

As shown in FIG. 2, the vehicle 1 includes an accelerating operation member for the driver to control the drive source of the vehicle 1. The vehicle 1 includes an accelerator pedal 9 configured to be operated by a driver's leg as the accelerating operation member. The accelerating operation member is not United to the accelerator pedal 9. For example, the vehicle 1 may include an accelerator grip operated by hand as the accelerating operation member. The vehicle 1 includes an accelerator switch 9a and an accelerator position sensor 9b. The accelerator switch 9a outputs an ON/OFF signal indicating whether or not the accelerator pedal 9 has been operated, that is, whether or not the accelerator pedal 9 is depressed by the driver. The accelerator position sensor 9b outputs a signal corresponding to the operation amount (depression amount) of the accelerator pedal 9. As described later, the controller 30 includes a manual operation mode and an automatic operation mode as its control modes. In the manual operation mode, the controller 30 controls the vehicle drive motor 4 based on the output signal of the accelerator position sensor 9b. The vehicle 1 includes encoders 26 and 27, provided to a transmission 5. In the automatic operation mode, the controller 30 controls the vehicle drive motor 4 based on a target speed and an actual speed calculated based on output signals of the encoders 26, 27 so that a speed of the vehicle 1 matches the target speed (hereinafter, the speed of the vehicle 1 is referred as to "vehicle speed"). The vehicle 1 does not necessarily include the accelerator switch 9a. In this case, the controller 30 may determine whether the accelerating operation member has been operated based on the output signal of the accelerator position sensor 9b.

As shown in FIG. 2, the vehicle 1 includes brake devices 11F provided in the front wheels 2 and brake devices 11R provided in the rear wheels 3 (the brake devices 11F, 11R corresponds to the "second brake device" in the claims). In addition, the vehicle 1 includes a brake operation member for the driver to operate the brake devices 11F, 11R. The vehicle 1 includes a brake pedal 12 as the brake operation member. The vehicle 1 may include a brake lever operated by hand as the brake operation member. The brake devices 11F and 11R are hydraulic brakes, for example. The vehicle 1 includes a master cylinder 12a. The master cylinder 12a generates hydraulic pressure according to the operation amount (depression amount) of the brake pedal 12 by the driver, and actuates the brake devices 11F, 11R. Further, the vehicle 1 includes a hydraulic unit 12c and a hydraulic unit driver 33. The hydraulic unit driver 33 drives the hydraulic unit 12c according to a signal from the controller 30. The hydraulic unit 12c receives drive power from the hydraulic unit driver 33 and regulates the master cylinder 12a. The brake devices 11F and 11R are controlled by the controller 30 in the automatic operation mode and are operated through the brake pedal 12 in the manual operation mode. The vehicle 1 includes a brake switch 12b that outputs an ON/OFF signal indicating whether or not the brake pedal 12 has been operated, that is, whether the brake pedal 12 has been depressed or not. Unlike the example of the vehicle 1, the brake pedal 12 and the brake devices 11F and 11R may be connected by wires.

As shown in FIG. 2, the vehicle 1 includes a parking brake device 13 (the parking brake device 13 corresponds to the "first brake device" in the claims). The parking brake device 13 is an electromagnetic brake device controlled by a signal (ON/OFF signal) from the controller 30. The parking brake device 13 restrains the rotation of the rear wheels 3 in a vehicle stop state of the vehicle 1 and permits the rotation of the rear wheels 3 in a vehicle running state of the vehicle 1. Hereinafter, a state in which the parking brake device 13 restrains the rotation of the rear wheels 3 is referred to as a "locked state". A state in which the parking brake device 13 permits the rotation of the rear wheels 3 is referred to as an "unlocked state". In the example of the vehicle 1, the parking brake device 13 is provided on a rotation axis of the transmission 5, restrains the rotation of the rotation axis of the transmission 5 in the vehicle stop state, and permits the rotation of the rotation axis in the vehicle running state. The position of the parking brake device 13 is not necessarily on the transmission 5. For example, the parking brake device 13 may be provided on each of the left and right rear wheels 3. As will be described later, the parking brake device 13 operates under a control of the controller 30 when the vehicle 1 transitions to the vehicle stop state, to maintain the vehicle 1 in the vehicle stop state. That is, the parking brake device 13 works automatically when the vehicle 1 transitions to the vehicle stop state. In other words, the parking brake device 13 works without an operator's input.

As shown in FIG. 2, the vehicle 1 includes a steering operation member for the driver to steer the front wheels 2. The vehicle 1 includes a steering wheel 15 as the steering operation member. The steering wheel 15 is linked to the front wheel 2 via a steering shaft 18 and a tie rod 19. The vehicle 1 may include a rod-like member (steering bar) as the steering operation member instead of the steering wheel 15.

In the automatic operation mode, the vehicle 1 runs along an induction line (guiding line) laid in a running course. The running course is established, for example, on public roads or golf courses. As shown in FIG. 2, the vehicle 1 includes a plurality of induction line sensors 16R, 16C, and 16L aligned in the left-right direction. Each induction line sensor 16R, 16C, and 16L detects the induction line to output a signal corresponding to the relative position between the induction line sensors 16R, 16C, 16L and the induction line. In other words, each induction line sensor 16R, 16C, and 16L detects the induction line to output a signal corresponding to distance between the induction line and the induction line sensor 16R, 16C, 16L (that is, a signal corresponding to positional deviation between the vehicle and the induction line). Hereinafter, the induction line sensors 16R, 16C, and 16L are referred to as "induction line sensor 16". A signal from the induction line sensor 16 is input to the controller 30 through an amplifier 34. The vehicle 1 includes a steering motor 17 and a steering motor driver 35 for steering the front wheels 2. In the automatic operation mode, the controller 30 controls the steering motor 17 based on the signal from the induction line sensor 16 and steers the front wheels 2 so that the vehicle 1 does not deviate from the running course. The steering motor driver 35 applies a voltage corresponding to the command value from the controller 30 to the steering motor 17.

The vehicle 1 includes a steering sensor 23. The steering sensor 28 outputs a signal indicating whether or not the steering wheel 15 has been operated. The steering sensor 28 is, for example, a torque sensor that outputs a signal corresponding to the torque acting on the steering shaft 18. The steering sensor 28 is not necessarily a torque sensor.

As shown in FIG. 2, the vehicle 1 includes a bumper switch 21a for detecting that an obstacle hits a bumper 21 (see FIG. 1) of the vehicle 1. Further, the vehicle 1 includes collision prevention sensors 22a and 22b for detecting another vehicle on the running course. Signals from the collision prevention sensors 22a and 22b are input to the controller 30 through a collision prevention controller 22c.

The vehicle 1 also includes a specified position sensor 24 for detecting specified positions predefined at a plurality of positions on the running course. Each specified position is predefined, for example, at a stop position where the vehicle should stop, a right turn position at which the vehicle should turn right, and a left turn position at which the vehicle should turn left. Detection targets are installed in each specified position in advance. The specified position sensor 24 is, for example, a magnetic type proximity sensor. In this case, magnets are installed as the detection targets at the specified positions. The specified position sensor 24 may be a capacitance type proximity sensor or an oscillation type proximity sensor. In those cases, metal may be placed on each specified position.

As shown in FIG. 2, the vehicle 1 includes a main switch 41 for the driver to activate the controller 30 and to stop the controller 30. The vehicle 1 also includes a start/stop button 42 for the driver to instruct start/stop of the vehicle 1 in the automatic operation mode. In addition, the vehicle 1 include a forward switch 43a and a reverse switch 43b for the driver to indicate the running direction of the vehicle 1. In the example of the vehicle 1, the main switch 41 and the start/stop button 42 are provided on an operation panel 40. The operation panel 40 may include an indicator 44a for notifying an abnormality caused in the vehicle 1 and an indicator 44b for notifying that the vehicle 1 is positioned on the induction line. Further, the operation panel 40 may include a remaining power meter 46 for displaying the remaining electric power of the battery 29. Buttons and switches provided in the self-driving vehicle are not limited to the example of the vehicle 1 and may be changed as appropriate. The vehicle 1 includes left and right flashers 47. The controller 30 controls the flashers 47 through the flasher switch 47a.

Controller

As described above, the controller 30 has the automatic operation mode and the manual operation mode as its control modes. In the automatic operation mode, the controller 30 controls the vehicle 1 based on the output of the induction line sensor 16 so that the vehicle 1 runs along the induction line. In the manual operation mode, the controller 30 allows the vehicle 1 to run and stop in accordance with operation by the driver of an operation member (specifically, the accelerator pedal 9, the brake pedal 12, and the steering wheel 15). When the vehicle 1 is operated in the automatic operation mode, the controller 30 shifts from the automatic operation mode to the manual operation mode upon a trigger of operation of the operation member by the driver. When it is necessary for the driver to shift the control mode from the automatic operation mode to the manual operation mode, the driver is allowed to shift from the automatic operation mode to the manual operation mode by operating the operation member that is necessary to be operated by the driver after shifting to the manual operation mode. Therefore, compared to the conventional vehicle which requires the driver to find and use the operation button when shifting from the automatic operation mode to the manual operation mode, the vehicle 1 enables the driver to shift the control mode by an easier operation when it is necessary for the driver to shift from the automatic operation mode to the manual operation mode.

Figure 3:
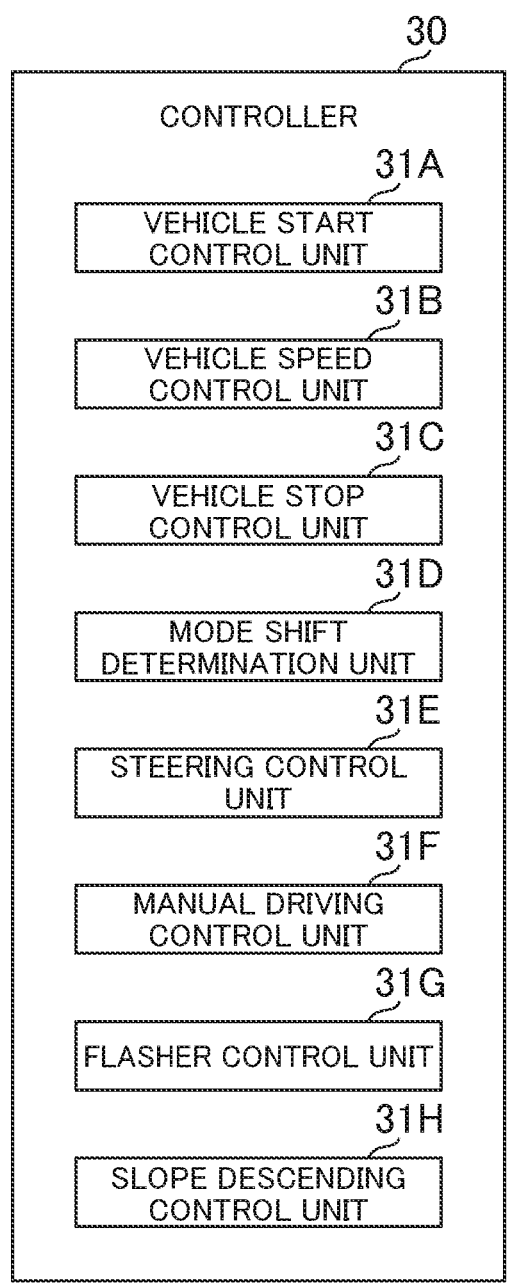
FIG. 3 is a block diagram showing an example of functions of the controller shown in FIG. 2.
Figure 4:
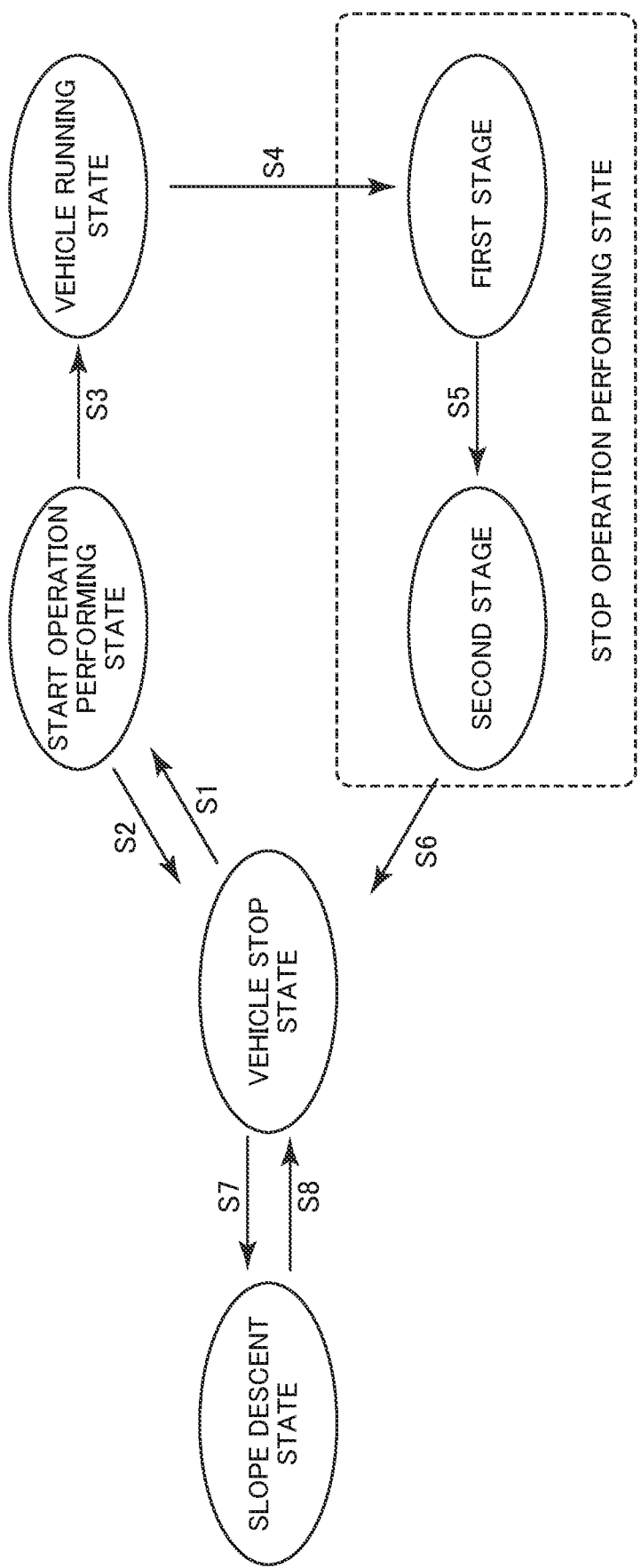
FIG. 4 is a diagram showing state transitions of the vehicle in the automatic operation mode.

FIG. 3 is a block diagram showing an example of functions of the controller 30. FIG. 4 is a diagram showing state transitions of the vehicle 1 in the automatic operation mode.

Automatic Operation Model

Vehicle Stop State

As shown in FIG. 3, in the example of the vehicle 1, the controller 30 includes a vehicle start control unit 31A, a vehicle speed control unit 31B, a vehicle stop control unit 31C, a mode shift determination unit 31D, a steering control unit 31E, a manual driving control unit 31F, a flasher control unit 31G, and a slope descending control unit 31H. These are realized by the CPU of the controller 30 executing a program prestored in the memory. Hereinafter, the state of the vehicle 1 and each function of the controller 30 will be described. First, the automatic operation mode will be described.

When the vehicle 1 is in the vehicle stop state (see FIG. 4), the parking brake device 13 is set to the locked state. The fact that the vehicle 1 is in the vehicle stop state means that the vehicle speed is lower than a predefined threshold close to 0 km/h (this threshold is referred to as a "stop determination speed"). In the example of the vehicle 1, when the vehicle 1 is in the vehicle stop state, the drive control circuit 32 is stopped. That is, the power supplied to the vehicle drive motor 4 by the drive control circuit 32 is restricted. For example, a switch (e.g. a switch element such as a transistor in the drive control circuit 32) that permits power supplied from the battery 29 to the drive control circuit 32, is set to an OFF state by the controller 30. In the example of the vehicle 1, when the vehicle 1 is in the vehicle stop state, a flag stored in the memory of the controller 30 is set to "stop" (hereinafter this flag is referred to as "start/stop flag").

Vehicle Start Control Unit

When the driver operates the start/stop button 42 to instruct the start of running (S1), the vehicle 1 shifts to the start operation performing state (see FIG. 4). At that time, the controller 30 starts the processing for the vehicle start control unit 31A. The vehicle start control unit 31A allows the operation of the drive control circuit 32. The vehicle start control unit 31A, for example, sets the switch element in the drive control circuit 32 to the ON state to permit power to be supplied from the drive control circuit 32 to the vehicle drive motor 4. The vehicle start control unit 31A increases the electric current command value to be output to the drive control circuit 32. As a result, the electric power (electric current value) supplied from the drive control circuit 32 to the vehicle drive motor 4 increases. Then, when the torque output from the vehicle drive motor 4 exceeds a threshold value, the vehicle start control unit 31A sets the parking brake device 13 to the unlocked state (S3) (hereinafter this threshold value is referred to as "parking brake release torque"). As a result, the vehicle 1 shifts to the vehicle running state from the vehicle stop state (see FIG. 4). On the other hand, when the torque of the vehicle drive motor 4 does not increase despite the increase of the electric current command value, the controller 30 does not release the locked state of the parking brake device 13, and the vehicle 1 returns to the vehicle stop state.

Note that the vehicle 1 may include an inclination sensor for detecting the inclination degree of the running course. In this case, the vehicle start control unit 31A may change the parking brake release torque according to the inclination of the running course. For example, when the running course is uphill, the parking brake release torque may be higher than when the running course is flat. In addition, the process of the vehicle start control unit 31A may be started only when the induction line sensor 16 detects the induction line.

Vehicle Running State

When the parking brake device 13 is set to the unlocked state (S3), the vehicle 1 transitions to the vehicle running state, and the vehicle speed control unit 31B and the steering control unit 31E begin to operate.

The vehicle speed control unit 31B drives the vehicle drive motor 4 so that the actual vehicle speed matches the target vehicle speed. Specifically, the vehicle speed control unit 31B calculates the actual vehicle speed based on the outputs of the encoders 26 and 27, sets the target speed based on the output of the specified position sensor 24, and calculates the command value based on the difference between the actual vehicle speed and the target vehicle speed. The drive control circuit 32 supplies an electric current corresponding to the command value to the vehicle drive motor 4. The vehicle speed control unit 31B may execute PID control. That is, the vehicle speed control unit 31B may calculate the command value using the difference between the actual vehicle speed and the target vehicle speed, the differential value of the difference, and the integral value of the difference.

The vehicle speed control unit 31B may set the target vehicle speed according to the driving environment. For example, the vehicle speed control unit 31B may lower the target vehicle speed in places where the vehicle 1 should slow down (for example, around a curved road or on a downhill slope). In this case, the vehicle speed control unit 31B may execute a regenerative brake control to return power from the vehicle drive motor 4 to the battery 29. In the case where the actual vehicle speed does not decrease to the target vehicle speed only by the regenerative brake control, the vehicle speed control unit 31B may actuate the brake devices 11F and 11R to generate the braking force.

The steering control unit 31E steers the front wheels 2 based on the relative position between the induction line and the vehicle 1 so that the vehicle 1 moves along the induction line. Specifically, the steering control unit 31E calculates the distance between the vehicle 1 and the induction line based on the output of the induction line sensor 16, and calculates the command value based on the distance. The steering motor driver 35 applies a voltage corresponding to the command value to the steering motor 17. The control of the steering control unit 31E will be described in detail later.

Stop Operation Performing State

When a predetermined stop condition is satisfied during running (S4), the vehicle 1 shifts to the stop operation performing state (see FIG. 4). The controller 30 determines that the stop condition is satisfied, for example, when the driver instructs to stop through the start/stop button 42 or when the specified position sensor 24 detects a specified position at which the vehicle 1 should be stopped. Further, when the distance from the induction line to the induction line sensor 16 becomes larger than a threshold value or when other vehicles or obstacles are detected based on the outputs of the collision prevention sensors 22a or 22b or the bumper switch 21a, the controller 30 may determine that the stop condition is satisfied.

When the stop condition is satisfied, the vehicle stop control unit 31C decelerates the vehicle 1 (this is the first stage (see FIG. 4). Then, when the actual vehicle speed becomes lower than the threshold value, the vehicle stop control unit 31C sets the parking brake device 13 to the locked state (S5). (Hereinafter, this threshold is referred to as "Parking brake device lock speed". "Parking brake device lock speed" is a speed at which the vehicle 1 is substantially stopped.) In the example of the vehicle 1, the vehicle stop control unit 31C stops the operation of the drive control circuit 32 when a predetermined time (for example, several hundreds of millisecond to several seconds) has elapsed after setting the parking brake device 13 to the locked state. As a result, the vehicle 1 enters the vehicle stop state. After the parking brake device 13 is set to the locked state, the period until the predetermined time elapses is the second stage (see FIG. 4) of the stop operation performing state. As described above, in the example of the vehicle 1, the stop operation performing state includes the first stage defined as a period before the parking brake device 13 is set to the locked state and the second stage defined as a period after the parking brake device 13 is set to the locked state. As will be described later, in the example of the vehicle 1, the first stage and the second stage are different from each other in a mode shift condition from the automatic operation mode to the manual operation mode.

Figure 5:
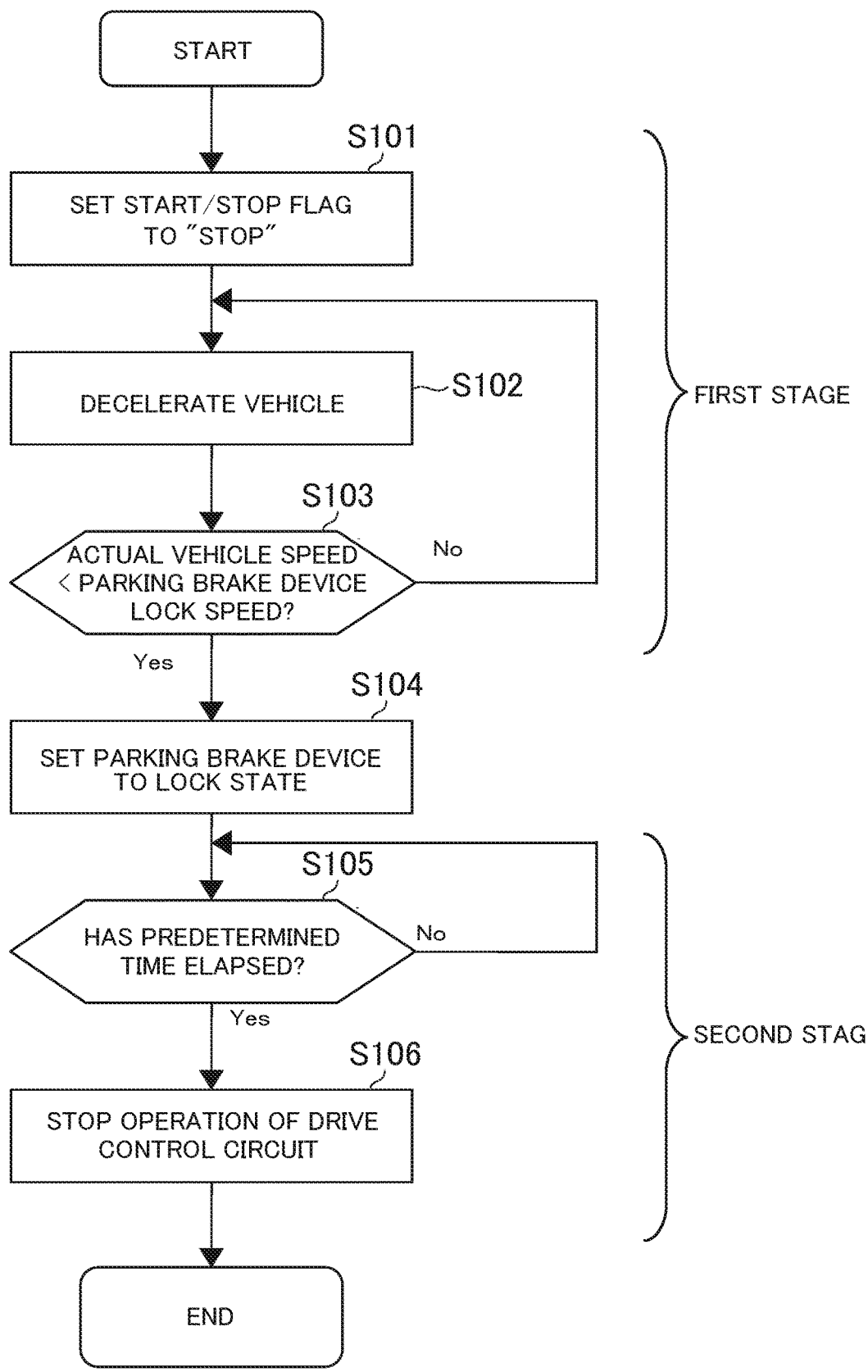
FIG. 5 is a flowchart showing an example of processing executed by the stop control unit shown in FIG. 3.

FIG. 5 is a flowchart showing an example of processing executed by the vehicle stop control unit 31C. When the above-mentioned stop condition is satisfied, the vehicle stop control unit 31C sets the start/stop flag stored in the memory to "stop" (S101). The vehicle stop control unit 31C decelerates the vehicle 1 (S102). Specifically, the vehicle stop control unit 31C gradually reduces the target vehicle speed at a predetermined deceleration and executes the regenerative brake control so that the actual vehicle speed follows the target vehicle speed. If the actual vehicle speed does not decrease to the target vehicle speed only by the regenerative brake control, the vehicle stop control unit 31C may actuate the brake devices 11F and 11R. Then, the vehicle stop control unit 31C determines whether or not the actual vehicle speed becomes lower than the parking brake device lock speed (S103). If the actual vehicle speed is still not lower than the parking brake device lock speed, the vehicle stop control unit 31C returns to S102 and further decelerates the vehicle 1. When the actual vehicle speed is lower than the parking brake device lock speed, the vehicle stop control unit 31C sets the parking brake device 13 to the locked state (S104). Then, after setting the parking brake device 13 to the locked state, the vehicle stop control unit 31C determines whether or not a predetermined time has elapsed (S105). The vehicle stop control unit 31C waits until the predetermined time has elapsed. When the predetermined time has elapsed, the vehicle stop control unit 31C stops the operation of the drive control circuit 32 and restricts the power supplied from the drive control circuit 32 to the vehicle drive motor 4 (S106). As a result, the vehicle 1 is in the vehicle stop state. As shown in FIG. 5, the process before S104 is the first stage, and the process after S104 is the second stage.

When the parking brake device 13 fails on a slope, the vehicle 1 descends the slope. In that case, the vehicle 1 transitions to the slope descent state (see FIG. 4). That is, when the vehicle speed becomes higher than the threshold value though the parking brake device 13 is set to the locked state in the vehicle stop state (S7), the process of the slope descending control unit 31H sets the vehicle 1 to the slope descent state. The slope descending control unit 31H activates the brake devices 11F and 11R. For example, the slope descending control unit 31H operates the brake devices 11F and 11R at regular time intervals. This operation gradually lowers the vehicle 1 on the slope. When the vehicle 1 descends to a flat position and the vehicle speed becomes lower than a threshold value (S8), the slope descending control unit 31H ends the process thereof and the vehicle 1 returns to the vehicle stop state. The above description was for the states of the vehicle 1 in the automatic operation mode.

Mode Shift Determination Unit

When the vehicle 1 is operated in the automatic operation mode, the controller 30 shifts from the automatic operation mode to the manual operation mode upon a trigger of the operation of the operation members by the driver. Specifically, the operation members are the accelerator pedal 9, the brake pedal 12, and the steering wheel 15. Hereinafter, the transition from the automatic operation mode to the manual operation mode is referred to as "mode shift". In the example of the vehicle 1, the operation members defined as the trigger for the mode shift vary depending on the state of the vehicle 1. In other words, one or more operation members which are the trigger of the mode shift for a first state (for example, the vehicle running state) are different from one or more operation members which are the trigger of the mode shift for a second state (for example, the vehicle stop state). As a result, the driver is allowed to shift the control mode by operating the operation member that is defined corresponding to the state of the vehicle in the automatic operation mode and is operated by the driver after shifting to the manual operation mode. Hereinafter, the operation member that is defined as the trigger for the mode shift is referred to as "trigger member".

The controller 30 detects the operation of the accelerator pedal 9, for example, based on the output of the accelerator switch 9a. Further, the controller 30 detects the operation of the brake pedal 12, for example, based on the output of the brake switch 12b, and detects the operation of the steering wheel 15, for example, based on the output of the steering sensor 28. The means for detecting the operation is not limited to the example of the vehicle 1, and other means may be used.

As described above, the controller 30 includes the mode shift determination unit 31D. The mode shift determination unit 31D determines whether or not it shifts the control mode to the manual operation mode from the automatic operation mode when any one of the accelerator pedal 9, the brake pedal 12, and the steering wheel 15, is operated in the automatic operation mode. That is, the mode shift determination unit 31D determines whether or not the operation performed in the automatic operation mode conforms to a predefined mode shift condition. Then, when the operation conforms to the mode shift condition, the mode shift determination unit 31D shifts the control mode from the automatic operation mode to the manual operation mode.

FIG. 6 is a table for explaining an example of the mode shift condition from the automatic operation mode to the manual operation mode. In this table, the left column shows the states of the vehicle 1 described above, and the uppermost row indicates the operation members operated by the driver, that is, the accelerator pedal 9, the brake pedal 12, and the steering wheel 15. In this table, "○" indicates that an operation member is defined as the trigger member, and "X" indicates that an operation member is not defined as the trigger member.

As shown in FIG. 6, in the example of the vehicle 1, each of the accelerator pedal 9, the brake pedal 12, and the steering wheel 15 is defined as the trigger member for the vehicle running state. Therefore, in the vehicle running state, the controller 30 shifts from the automatic operation mode to the manual operation mode upon a trigger of operation of any one of the accelerator pedal 9, the brake pedal 12, and the steering wheel 15. In other words, when the accelerator pedal 9 is operated, when the brake pedal 12 is operated, or when the steering wheel 15 is operated, the controller 30 performs the mode shift. When, for example, it is necessary in the vehicle running state in the automatic operation mode for the driver to change the vehicle speed, to deviate the vehicle 1 from the induction line, or the like, the driver needs an operation to shift from the automatic operation mode to the manual operation mode. After shifting in the vehicle running state to the manual operation mode, it is necessary for the driver to operate the accelerator pedal 9, the brake pedal 12, and the steering wheel 15. That is, the accelerator pedal 9, the brake pedal 12, and the steering wheel 15, that are predefined as the trigger for the mode shift in the vehicle running state are operation members that need to be operated after shifting in the vehicle running state to the manual operation mode. Therefore, the driver can immediately start driving the vehicle 1 in the manual operation mode by operating those operation members.

As shown in FIG. 6, in the example of the vehicle 1, each of the accelerator pedal 9, the brake pedal 12, and the steering wheel 15 is predefined as the trigger member for the start operation performing state in the automatic operation mode, similarly to the vehicle running state.

As shown in FIG. 6, the accelerator pedal 9 is defined as the trigger member for the vehicle stop state in the automatic operation mode. Therefore, in the vehicle stop state, the controller 30 shifts from the automatic operation mode to the manual operation mode upon a trigger of the operation of the accelerator pedal 9. When it is necessary for the driver to start running the vehicle 1 in the vehicle stop state in the automatic operation mode (that is, it is necessary for the driver to increase the vehicle speed), the driver operates to shift the control mode to the manual operation mode. The driver first operates the accelerator pedal 9 after shifting to the manual operation mode. That is, the accelerator pedal 9, which is predefined as the trigger member for the vehicle stop state, is an operation member that is necessary to be operated after shifting in the vehicle stop state to the manual operation mode. Therefore, the driver can immediately start driving the vehicle 1 in the manual operation mode by depressing the accelerator pedal 9 without any other operation. When the mode shift occurs in the vehicle stop state, the controller 30 releases the parking brake device 13. That is, the controller 30 sets the parking brake device 13 to the unlocked state. The controller 30 drives the vehicle drive motor A according to the operation amount (depression amount) of the accelerator pedal 9.

As shown in FIG. 6, the other operation members (i.e., the brake pedal 12 and the steering wheel 15) are not defined as the trigger members for the vehicle stop state in the automatic operation mode. Therefore, in both the case where the brake pedal 12 is operated by the driver in the vehicle stop state and the case where the steering wheel 15 is operated by the driver in the vehicle stop state, the controller 30 maintains the automatic operation mode and does not execute the mode shift. Therefore, in the example of the vehicle 1, it is possible to prevent an unnecessary mode shift when the driver depresses the brake pedal 12 without the intention of shifting the control mode. Also, it is possible to prevent an unnecessary mode shift, when the driver operates the steering wheel 15 without the intention of shifting the control mode.

The accelerator pedal 9 and the steering wheel 15 are defined as the trigger members for the stop operation performing state in the automatic operation mode. Therefore, in a period after the predetermined stop condition is satisfied in the automatic operation mode and until the vehicle 1 transitions into the vehicle stop state in the automatic operation mode, the controller 30 executes the mode shift upon a trigger of the operation of any one of the steering wheel 15 and the accelerator pedal 9. In the stop operation performing state in the automatic operation mode, the driver operates to shift the control mode to the manual operation mode when it is necessary for the driver to increase the vehicle speed, in order to deviate the vehicle 1 from the induction line, or the like. After shifting in the stop operation performing state to the manual operation mode, the driver operates the accelerator pedal 9 and the steering wheel 15. That is, the accelerator pedal 9 and the steering wheel 15, which are predefined as the trigger members, are the operation members that need to be operated after shifting in the stop operation performing state to the manual operation mode. Therefore, in a period where the vehicle 1 runs at a low speed (that is, a period after the predetermined stop condition is satisfied in the automatic operation mode and until the vehicle 1 transitions into the vehicle stop state in the automatic operation mode), the driver can immediately start driving the vehicle 1 in the manual operation mode by depressing the accelerator pedal 9. Further, in this period, the driver can immediately change the running direction of the vehicle 1 to a direction which deviates from the induction line by operating the steering wheel 15 in order to avoid an obstacle on the induction line, for example. On the other hand, the brake pedal 12 is not defined as the trigger member for the stop operation performing state. Therefore, after the stop condition is satisfied, the controller 30 does not execute the mode shift upon a trigger of the operation of the brake pedal 12. When the driver depresses the brake pedal 12 in the stop operation performing state in the automatic operation mode, the controller 30 maintains the automatic operation mode to make the vehicle 1 in the vehicle stop state quickly.

As described above, in the example of the vehicle 1, the stop operation performing state has the first stage and the second stage. As shown in FIG. 6, the accelerator pedal 9 and the steering wheel 15 are predefined as the trigger members for the first stage. As described above, the first stage is a period until the parking brake device 13 transitions into the locked state and after the deceleration of the vehicle 1 starts by actuating the brake devices 11F and 11R, or by performing the regenerative brake control. In the period after a start of deceleration of the vehicle 1 and until the parking brake device 13 automatically works, the controller 30 executes the mode shift upon a trigger of the operation of any one of the accelerator pedal 9 and the steering wheel 15. In the first stage of the stop operation performing state in the automatic operation mode, the driver operates to shift the control mode to the manual operation mode when it is necessary to increase the vehicle speed, in order to deviate the vehicle 1 from the induction line, or the like. After shifting to the manual operation mode, it may be necessary for the driver to operate the accelerator pedal 9 and the steering wheel 15. That is, the accelerator pedal 9 and the steering wheel 15, which are defined as the trigger members for the first stage, are operation members that need to be operated after shifting in the first stage to the manual operation mode. Therefore, by depressing the accelerator pedal 9, the driver can immediately start driving the vehicle 1 in the manual operation mode. In addition, by operating the steering wheel 15, the driver can immediately change the running direction of the vehicle 1 to a direction which deviates from the induction line, so that the vehicle 1 avoids an obstacle on the induction line, for example. On the other hand, the brake pedal 12 is not defined as the trigger member for the first stage. Therefore, in the period after starting deceleration of the vehicle 1 and until the parking brake device 13 transitions into the locked state, the controller 30 does not execute the mode shift upon a trigger of the operation of the brake pedal 12.

The accelerator pedal 9 is defined as the trigger member for the second stage, like the vehicle stop state. Therefore, in the second stage, the controller 30 executes the mode shift upon a trigger of the operation of the accelerator pedal 9. In the second stage of the stop operation performing state in the automatic operation mode, the driver operates to shift the control mode to the manual operation mode when it is necessary to start running the vehicle 1 (to increase the vehicle speed). Therefore, after shifting in the second stage to the manual operation mode, the driver operates the accelerator pedal 9. That is, the accelerator pedal 9, which is defined as the trigger member for the second stage, is an operation member that needs to be operated after shifting in the second stage to the manual operation mode. Therefore, in the second stage of the stop operation performing state in the automatic operation mode, the driver can immediately start driving the vehicle 1 in the manual operation mode by depressing the accelerator pedal 9 without any other operation. After executing the mode shift in the second stage, the controller 30 first sets the parking brake device 13 to the unlocked state, and then starts driving the vehicle drive motor 4 according to the operation of the accelerator pedal 9. The other operation members (that is, the brake pedal 12 and the steering wheel 15) are not defined as the trigger members for the second stage. Therefore, the controller 30 does not execute the mode shift when the brake pedal 12 is operated in the second stage and when the steering wheel 15 is operated.

As described above, the brake pedal 12 is not defined as the trigger member for both the first stage and the second stage. On the other hand, the steering wheel 15 is defined as the trigger member for the first stage that is the period before the parking brake device 13 transitions into the locked state, and is not defined as the trigger member for the second stage that is the period after the parking brake device 13 transitions in the locked state.

As shown in FIG. 6, in the example of the vehicle 1, each of the accelerator pedal 9, the brake pedal 12, and the steering wheel 15, is defined as the trigger members for the slope descent state, like the vehicle running state. In other words, in the slope descent state, the controller 30 executes the mode shift upon a trigger of the operation of any one of the accelerator pedal 9, the brake pedal 12, and the steering wheel 15. Therefore, when the vehicle 1 starts to move, although the parking brake device 13 is in the locked state, the driver can depress the accelerator pedal 9 to move the vehicle 1 to a flat location. Further, when the vehicle 1 starts to move, although the parking brake device 13 is in the locked state, the driver can operate the steering wheel 15 to change the moving direction of the vehicle 1 and/or depress the brake pedal 12 to stop the vehicle 1.

The mode shift condition defined for the mode shift from the automatic operation mode to the manual operation mode is not limited to that shown in FIG. 6. For example, all of the accelerator pedal 9, the brake pedal 12, and the steering wheel 15, may be defined as the trigger members for the first stage of the stop operation performing state. Also, the first stage and the second stage of the stop operation performing state may have a common mode shift condition. For example, the steering wheel 15 and the accelerator pedal 9 may be defined as the trigger members for both the first stage and the second stage of the stop operation performing state. Also, in the example of FIG. 6, the trigger member for the start operation performing state is the same as the trigger member for the vehicle running state. However, the trigger member for the start operation performing state may be different from the trigger member for the vehicle running state.

Manual Operation Mode

Figure 7:
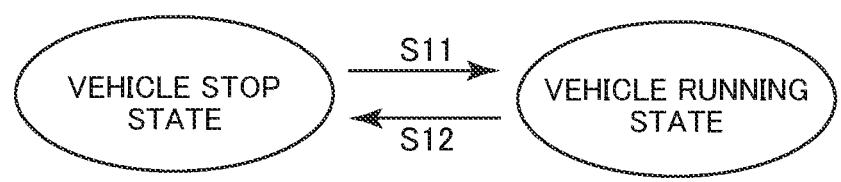
FIG. 7 is a diagram showing state transitions of the vehicle in the manual operation mode.

FIG. 7 is a diagram showing state transitions of the vehicle 1 in the manual operation mode. When the vehicle 1 is in the vehicle stop state in the manual operation mode, the parking brake device 13 is set to the locked state. Also, when the vehicle 1 is in the vehicle stop state, the drive control circuit 32 is stopped, so that power supplied to the vehicle drive motor 4 by the drive control circuit 32 is restricted.

When the accelerator pedal 9 is operated (depressed) in the vehicle stop state (S11), the vehicle 1 shifts to the vehicle running state. In the vehicle running state, the controller 30 drives the vehicle drive motor 4 based on the position of the accelerator pedal 9 (that is, based on the output of the accelerator position sensor 9b). When the accelerator pedal 9 is returned to an initial position (that is, when the accelerator pedal 9 is not depressed), the controller 30 executes the regenerative brake control to decelerate the vehicle 1. In the manual operation mode, the controller 30 does not control the brake devices 11F and 11R. The brake devices 11F and 11R work in accordance with the operation (depression amount) of the brake pedal 12 by the driver. When the vehicle speed becomes lower than a threshold value (that is, the stop determination speed) in the vehicle running state, the controller 30 sets the parking brake device 13 to the locked state and stops the operation of the drive control circuit 32 (S12). As a result, the vehicle 1 returns to the vehicle stop state. The "stop determination speed" may be the same as the "parking brake device lock speed" described above.

Figure 8:
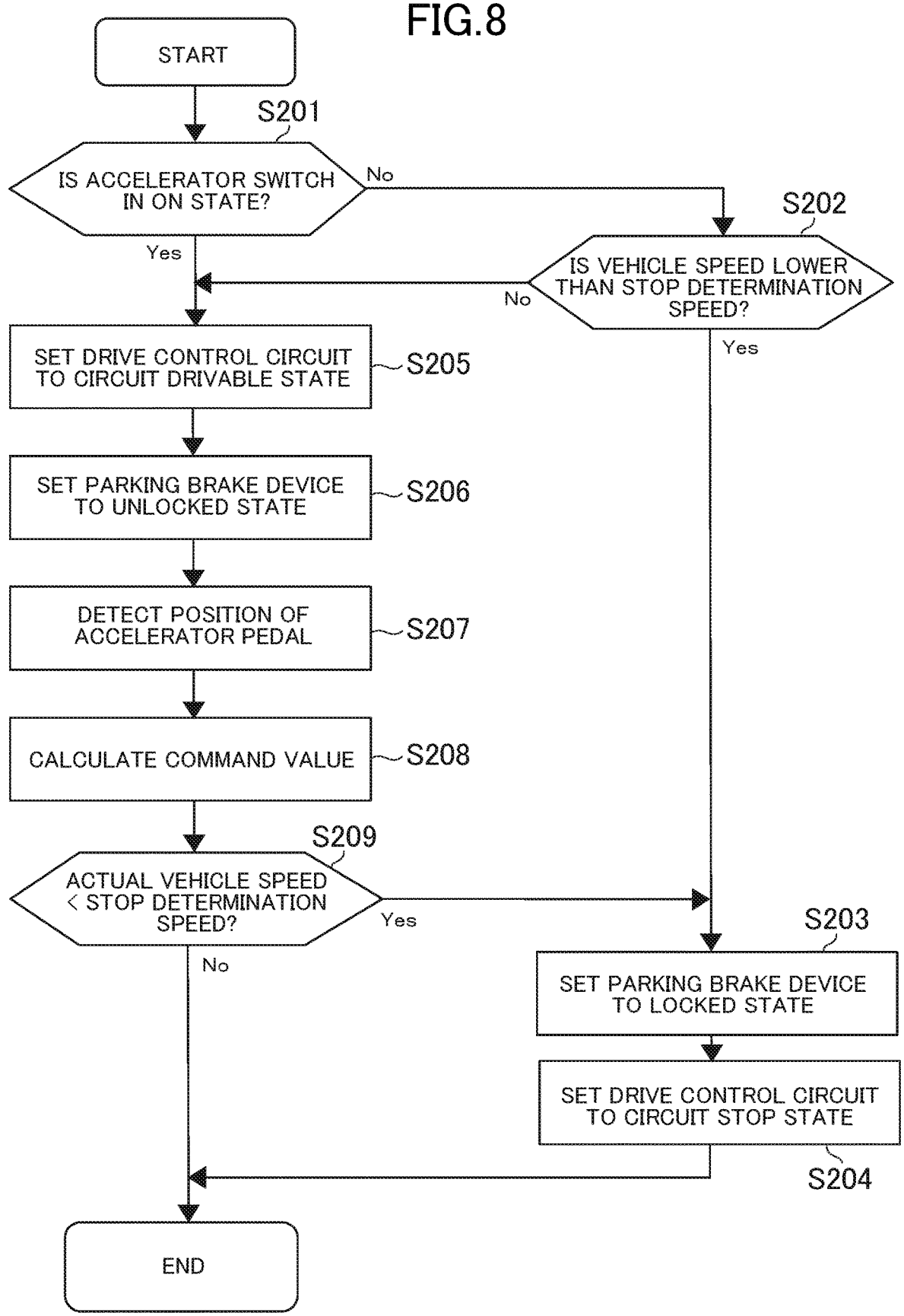
FIG. 8 is a flowchart showing an example of processing executed by the controller in the manual operation mode.

As described above, the controller 30 includes the manual driving control unit 31F (see FIG. 3). The manual driving control unit 31F controls the vehicle 1 in the manual operation mode. FIG. 8 is a flowchart showing an example of processing executed by the manual driving control unit 31F. The process shown in FIG. 8 is repeatedly executed at a predetermined cycle in the manual operation mode. The process of FIG. 8 is merely an example and may be changed as appropriate.

The manual driving control unit 31F determines whether or not the accelerator switch 9a is in the ON state (S201). When the accelerator switch 9a is not in the ON state, the manual driving control unit 31F determines whether the vehicle speed is lower than the stop determination speed (S202). When the vehicle speed is lower than the stop determination speed, the manual driving control unit 31F determines that the vehicle 1 is in the vehicle stop state and sets the parking brake device 13 to the locked state (S203). Further, the manual driving control unit 31F sets the drive control circuit 32 to a circuit stop state to restrict the power supplied by the drive control circuit 32 to the vehicle drive motor 4 (S204).

On the other hand, when the accelerator switch 9a is in the ON state in S201, or when the vehicle speed is not lower than the stop determination speed in S202, the manual driving control unit 31F sets the drive control circuit 32 to a circuit drivable state (that is, a state where the switch element inside the drive control circuit 32 is turned on) to permit power supplied by the drive control circuit 32 to the vehicle drive motor 4 (S205), and sets the parking brake device 13 to the unlocked state (S206). Specifically, when the vehicle 1 was in the vehicle stop state in the previous cycle, the drive control circuit 32 is switched from the circuit stop state (that is, a state where the switch element inside the drive control circuit 32 is turned off) to the circuit drivable state and the parking brake device 13 is switched from the locked state to the unlocked state in S205 and S206 of the present cycle. On the other hand, when the vehicle 1 was in the vehicle running state in the previous cycle, the state of the drive control circuit 32 is maintained and the state of the parking brake device 13 is maintained in S205 and S206 of the present cycle because the parking brake device 13 has been already in the unlocked state and the drive control circuit 32 has been already in the circuit drivable state.

The manual driving control unit 31F detects the position of the accelerator pedal 9 (depression amount of the accelerator pedal 9) with the accelerator position sensor 9b (S207). The manual driving control unit 31F drives the vehicle drive motor 4 according to the position of the accelerator pedal 9. Specifically, the manual driving control unit 31F outputs a command value corresponding to the position of the accelerator pedal 9 to the drive control circuit 32 (S208). The drive control circuit 32 supplies an electric current corresponding to the command value to the vehicle drive motor 4. When the accelerator pedal 9 is returned to the initial position, that is, when the depression amount of the accelerator pedal 9 is lower than a threshold value, the manual driving control unit 31F may execute the regenerative brake control to return electric power from the vehicle drive motor 4 to the battery 29 in S208. As a result, the vehicle 1 may be decelerated.

Next, the manual driving control unit 31F determines whether or not the actual vehicle speed is lower than the stop determination speed (S209). When the actual vehicle speed is not lower than the stop determination speed, the manual driving control unit 31F ends the present cycle and executes the processing of S201 of the next cycle. On the other hand, if the actual vehicle speed is lower than the stop determination speed in S209, the manual driving control unit 31F sets the parking brake device 13 to the locked state (S203) and sets the drive control circuit 32 to the circuit stop state (S204). As a result, the vehicle 1 shifts to the vehicle stop state. The above is an example of the processing executed by the controller 30 on the manual operation mode.

Processing in Mode Shift

As described above, when the operation performed on the automatic operation mode conforms to the mode shift condition shown in FIG. 6, the controller 30 shifts from the automatic operation mode to the manual operation mode. When the control mode shifts, the manual driving control unit 31F starts a process shown in FIG. 8, for example.

In the example of the vehicle 1, when the accelerator pedal 9 is operated in the vehicle stop state in the automatic operation mode, the controller 30 executes the mode shift. At that time, the manual driving control unit 31F switches the drive control circuit 32 from the circuit stop state to the circuit drivable state in S205 and switches the parking brake device 13 from the locked state to the unlocked state in S206. The manual driving control unit 31F controls the vehicle drive motor 4 according to the operation amount of the accelerator pedal 9 (S207, S208).

Also, for example, in the vehicle running state in the automatic operation mode, when the mode shift is made due to the operation of the brake pedal 12, or when the mode shift is made due to the operation of the steering wheel 15, the manual driving control unit 31 starts the processes shown in FIG. 8. In this case, if the vehicle speed is lower than the stop determination speed, the manual driving control unit 31F switches the parking brake device 13 from the unlocked state to the locked state (S203) and sets the drive control circuit 32 to the circuit stop state (S204). As a result, the vehicle 1 transitions to the vehicle stop state. In the example of the vehicle 1, even if the mode shift is executed on the automatic operation mode in any of the vehicle stop state, the start operation performing state, the vehicle running state, the stop operation performing state, and the slope descent state, the controller 30 starts the processing in the manual operation mode exemplified in FIG. 8.

Steering Control Unit

Processing executed by the steering control unit 31E will be described. In the automatic operation mode and the manual operation mode, the steering wheel 15 is interlocked with the front wheel 2. Therefore, the steering wheel 15 is disposed at a rotation angle corresponding to orientation of the front wheel 2. The steering control unit 31E controls the orientation of the front wheel 2 based on the relative position between the induction line and the vehicle 1 in the automatic operation mode. Specifically, the steering control unit 3E calculates the distance between the vehicle 1 and the induction line based on the output of the induction line sensors 16, and calculates the command value based on the distance. The steering motor driver 35 applies a voltage corresponding to the command value to the steering motor 17. The steering motor 17 is driven at a rotational speed corresponding to the voltage. In the example of the vehicle 1, the steering control unit 31E limits a change in the orientation of the front wheel 2 at the start time of running of the vehicle 1 on the automatic operation mode. This can prevent the rotational speed of the steering wheel 15 from rapidly increasing when the position and the orientation of the vehicle 1 greatly deviate from the induction line at the start time of running of the vehicle 1 in the automatic operation mode. Note that the control made by the steering control unit 31E may be applied to a vehicle in which the condition of mode shift does not differ depending on the state of the vehicle. That is, the control of the steering control unit 31E may be applied to a vehicle that does not have the mode shift conditions shown in FIG. 6.

The steering control unit 31E limits the change speed of the orientation of the front wheel 2, for example, at the start time of running of the vehicle 1 in the automatic operation mode. Specifically, the steering control unit 31E limits the rotation speed of the steering motor 17. In one example, an upper limit is defined to the rotation speed of the steering motor 17 at the start time of running. Another upper limit is defined to the rotation speed of the steering motor 17 at a time other than the start time of running (hereinafter, the "time other than the start time of running" is referred to as "normal time"). Then, the upper limit for the rotational speed at the start time of running is lower than the upper limit for that at the normal time. As another example, the command value to the steering motor driver 35 may be corrected at the start time of running. That is, a correction value may be used in calculation of the command value to the steering motor driver 35 so that the rotation speed of the steering motor 17 becomes lower at the start time of running than at the normal time. In still another example, the arithmetic expression used in calculating the command value to the steering motor driver 35 may be different between the normal time and the start time of running. For example, a coefficient of the arithmetic expression used at the start time of running may be different from a coefficient of the arithmetic expression used at the normal time so that the rotational speed of the steering motor 17 becomes lower at the start time of running than at the normal time.

The steering control unit 31E determines the start time of running in the automatic operation mode, for example, based on the vehicle speed. For example, when the vehicle 1 starts running in the vehicle stop state in the automatic operation mode and the vehicle speed is equal to or less than a threshold speed, the steering control unit 31E determines that the vehicle 1 is in the start time of running (hereinafter, this threshold speed is referred to as "running start determination speed"). Alternatively, the steering control unit 31E determines that the vehicle 1 is in the start time of running when the control mode shifts from the manual operation mode in the vehicle running state to the automatic operation mode and the vehicle speed is equal to or less than the running start determination speed. In another example, the steering control unit 31E may determine the start time of running based on the operation of the start/stop button 42. For example, the steering control unit 31E may determine that the vehicle 1 is in the start time of running after a start of running is instructed through the start/stop button 42 to the controller 30 and until a predetermined time (for example, several seconds) elapsed. In still another example, the steering control unit 31E may determine that the vehicle 1 is in the start time of running when the predetermined time has not elapsed after the start of running was instructed through the start/stop button 42 and the vehicle speed is lower than a threshold.

Figure 9:
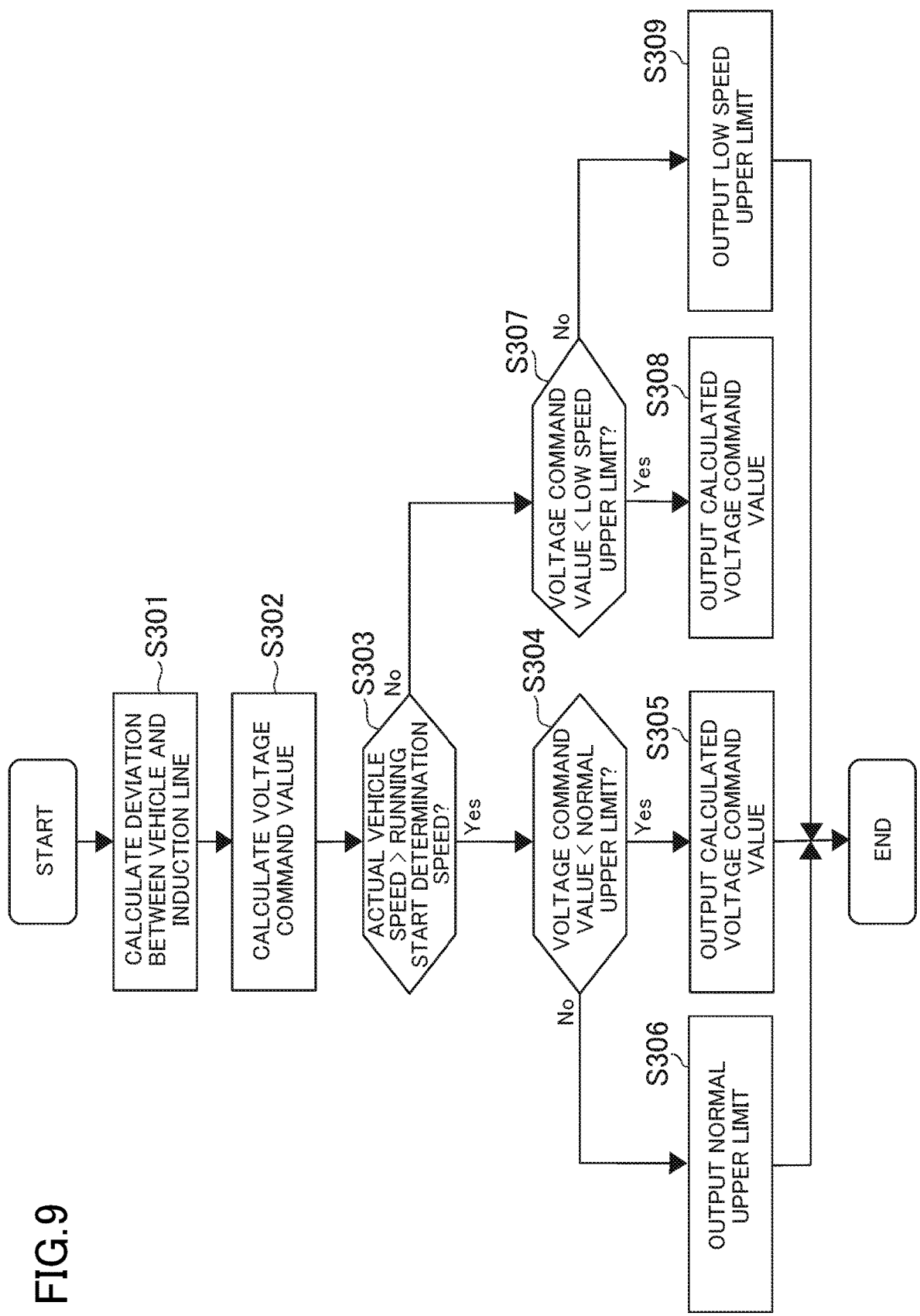
FIG. 9 is a flowchart illustrating an example of a process executed in the automatic operation mode by a steering control unit shown in FIG. 3.

FIG. 9 is a flowchart showing an example of the processing executed by the steering control unit 31E on the automatic operation mode. This process is repeatedly executed at a predefined cycle on the automatic operation mode. It should be noted that the process of FIG. 9 is merely an example and may be appropriately changed.

First, the steering control unit 31E calculates the distance (deviation) between the vehicle (induction line sensors 16) and the induction line based on the output of the induction line sensors 16 (S301). Then, the steering control unit 31E calculates a voltage command value (for example, a duty ratio) based on the calculated deviation (S302). PID control may be executed in calculating the voltage command value. That is, the voltage command value may be calculated based on the deviation, the differential value of the deviation, and the integral value of the deviation. The steering control unit 31E determines whether or not the actual vehicle speed is higher than the running start determination speed (S303).

In determination of S303, if the actual vehicle speed is higher than the running start determination speed, the steering control unit 31E further determines whether the voltage command value is lower than a normal upper limit (S304). The normal upper limit is an upper limit to be applied in the normal time. When the voltage command value is lower than the normal upper limit, the steering control unit 31E outputs the voltage command value to the steering motor driver 35 (S305). In this case, the rotation speed of the steering motor 17 is lower than the upper limit in the normal time. On the other hand, if the voltage command value is not lower than the normal upper limit in S304, the steering control unit 31E outputs the normal upper limit to the steering motor driver 35 (S306). As a result, the rotational speed of the steering motor 17 is set to the upper limit for the normal time.

If the actual vehicle speed is not higher than the running start determination speed in S303, the steering control unit 31E determines whether or not the calculated voltage command value is lower than a predefined low speed upper limit (S307). The low speed upper limit is the upper limit for the start time of running, which is lower than the above normal upper limit. When the voltage command value is lower than the low speed upper limit, the steering control unit 31E outputs the calculated voltage command value to the steering motor driver 35 (S308). As a result, the rotation speed of the steering motor 17 becomes lower than the upper limit for the start time of running. On the other hand, if the voltage command value is not lower than the low speed upper limit in S307, the steering control unit 31E outputs the low speed upper limit to the steering motor driver 35 (S309). As a result, the rotation speed of the steering motor 17 is set to the upper limit for the start time of running. By the above processing, the change of the orientation of the front wheels 2 can be limited in the start time of running of the vehicle 1 in the automatic operation mode.

As described above, in the example of the vehicle 1, the steering wheel 15 is defined as the trigger member for the mode shift in the vehicle running state in the automatic operation mode. Therefore, in the vehicle running state of the vehicle 1, the control mode shifts from the automatic operation mode to the manual operation mode upon a trigger of the operation of the steering wheel 15. Accordingly, when the driver instructs the controller 30 to start running the vehicle 1 through the start/stop button 42 in a state where the driver grips the steering wheel 15, the controller 30 may determine that the steering wheel 15 has been operated. For example, when a start of running is instructed through the start/stop button 42 in a state where the vehicle 1 deviates from the induction line, the steering motor 17 is driven under the control of the steering control unit 31E, and the steering wheel 15 may rotate together with the front wheels 2. At that time, since the steering wheel 15 is gripped by the driver, torque may be generated on the steering shaft 18. Therefore, the controller 30 may determine that the steering wheel 15 has been operated. In this case, immediately after the vehicle 1 starts running, the controller 30 shifts from the automatic operation mode to the manual operation mode. Therefore, it is possible to prevent the rotational speed of the steering wheel 15 from rapidly increasing.

Flasher Control Unit

As described above, the controller 30 includes a flasher control unit 31G (see FIG. 3). The flasher control unit 31G controls the flashers 47 on the automatic operation mode without any operation by the driver. For example, based on the output of the specified position sensor 24, the flasher control unit 31G detects a specified position where the vehicle 1 should turn right and a specified position where the vehicle 1 should turn left. At that time, the flasher control unit 31G blinks one of the left and right flashers 47 according to the direction in which the vehicle 1 turns. (Hereinafter, the specified position where the vehicle should turn right is referred to as "right turn point". Further, the specified position where the vehicle should turn left is referred to as "left turn point".) The flasher control unit 31G can therefore reduce the burden on the driver. Further, the flasher control unit 31G detects a specified position where the flasher 47 should be turned off based on the output of the specified position sensor 24. The flasher control unit 31G may turn off the flasher 47 when detecting the specified position where the flasher 47 should be turned off. Further, the flasher control unit 31G may detect the operation of the flasher switch 47*a* by the driver based on the output of the flasher switch 47*a*. The flasher control unit 31G may turn off the flasher 47 after detecting the operation of the flasher switch 47*a* by the driver.

As described above, magnets are employed as an example of the detection target of the specified position sensor 24. FIG. 10 shows an example of magnets installed in the running course. Reference character (a) of FIG. 10 shows magnets installed at the left turn point, and reference character (b) of FIG. 10 shows magnets installed at the right turn point. As shown in the figures, two magnets are arranged at the right turn point and the left turn point. In the right turn point and the left turn point, the arrangement of the magnets is opposite. Reference character (c) of FIG. 10 shows an example of magnets arranged in a specified position where the flasher 47 should be turned off. Reference character (c), two magnets that have the same polarity are arranged.

The flasher control unit 31G may blink both the left and right flashers 47 when detecting an obstacle or another vehicle on the running course based on the output of the bumper switch 21*a* and the collision prevention sensor 22*b*. Thus, the vehicle 1 can instantly alert people around the vehicle 1 to the situation of the vehicle 1.

Further, in the vehicle running state in the automatic operation mode, when the vehicle deviates from the running course, that is, when the distance between the induction line and the vehicle 1 becomes larger than a threshold value, the flasher control unit 31G may blink both the left and right flashers 47. Thus, the vehicle 1 can instantly alerts people around the vehicle 1 to the situation of the vehicle 1.

Furthermore, when an abnormality occurs in the vehicle 1, the flasher control unit 31G may blink both the left and right flashers 47. Thus, the vehicle 1 can instantly alerts people around the vehicle 1 to the situation of the vehicle 1. For example, when the temperature of the battery 29 becomes higher than a threshold value or the vehicle drive motor 4 does not work normally, the flasher control unit 31G may blink both the left and right flashers 47. Such abnormality notification may be executed in both the automatic operation mode and the manual operation mode.

As explained above, in self-driving vehicle 1, the operation members defined as the trigger for the mode shift differs depending on the state of vehicle 1 in the automatic operation mode. As a result, the driver is allowed to shift the control mode from the automatic operation mode to the manual operation mode by the operation of an operation member that is operated after shifting to the manual operation mode. It is unnecessary for the driver to perform a special operation for shifting from the automatic operation mode to the manual operation mode.

The vehicle 1 also includes the parking brake device 13 that automatically operates under the control of the controller 30 when the vehicle 1 transitions to the vehicle stop state and then maintains the vehicle 1 in the vehicle stop state. This reduces the operational burden on the driver and maintains the vehicle 1 in the vehicle stop state. Further, in the vehicle stop state in which the parking brake device 13 is operating, the controller 30 shifts from the automatic operation mode to the manual operation mode upon a trigger of the operation of the accelerator pedal 9, and releases the braking of the parking brake device 13. As a result, even in the vehicle stop state in which the parking brake device 13 is operating, the driver can immediately start driving the vehicle 1 in the manual operation mode by depressing the accelerator pedal 9.

The present invention is not limited to the self-driving vehicle 1 described above, and various modifications may be made. Although the present invention has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A self-driving vehicle comprising:
a plurality of operation members configured for a driver to operate, the operation members comprising:
a steering operation member,
a brake operation member, and
an accelerating operation member;
a sensor that detects an induction line installed along a running course; and
a controller having an automatic operation mode and a manual operation mode, wherein the controller controls, when in the automatic operation mode, the vehicle based on output of the sensor so that the vehicle runs along the induction line, wherein the controller allows, when in the manual operation mode, the vehicle to run and stop in accordance with the operation of the plurality of the operation members by the driver, and wherein the controller shifts from the automatic operation mode to the manual operation mode upon a trigger of operation of a predefined operation member among the plurality of the operation members, wherein the operation member that is predefined as the trigger for the shift from the automatic operation mode to the manual operation mode differs depending on a state of the vehicle in the automatic operation mode.

2. The self-driving vehicle according to claim 1, wherein in a vehicle stop state in the automatic operation mode, the controller shifts from the automatic operation mode to the manual operation mode upon a trigger of operation of the accelerating operation member, and in a vehicle running state in the automatic operation mode, the controller shifts from the automatic operation mode to the manual operation mode upon a trigger of operation of any one of the steering operation member, the brake operation member, and the accelerating operation member.

3. The self-driving vehicle according to claim 2, further comprising:

a first brake device that automatically starts working under a control of the controller when the vehicle transitions into the vehicle stop state, and the first brake device then maintains the vehicle in the vehicle stop state, wherein the controller shifts from the automatic operation mode to the manual operation mode upon a trigger of operation of the accelerating operation member in the vehicle stop state where the first brake device works and then releases braking of the first brake device.

4. The self-driving vehicle according to claim 2, wherein the controller does not shift from the automatic operation mode to the manual operation mode upon a trigger of operation of any one of the steering operation member and the brake operation member in the vehicle stop state in the automatic operation mode.

5. The self-driving vehicle according to claim 1, wherein the controller shifts from the automatic operation mode to the manual operation mode upon a trigger of operation of any one of the steering operation member, the brake operation member, and the accelerating operation member in a vehicle running state in the automatic operation mode, and after a predefined stop condition is satisfied during running in the automatic operation mode, the controller shifts from the automatic operation mode to the manual operation mode upon a trigger of operation of any one of the steering operation member and the accelerating operation member.

6. The self-driving vehicle according to claim 5, wherein after the stop condition is satisfied during running in the automatic operation mode and until the vehicle transitions into the vehicle stop state in the automatic operation mode, the controller shifts from the automatic operation mode to the manual operation mode upon a trigger of operation of any one of the steering operation member and the accelerating operation member.

7. The self-driving vehicle according to claim 5, wherein after the stop condition is satisfied during running in the automatic operation mode, the controller does not shift from the automatic operation mode to the manual operation mode upon a trigger of operation of the brake operation member.

8. The self-driving vehicle according to claim 1, further comprising:

a first brake device that automatically starts working under a control of the controller when the vehicle transitions into a vehicle stop state in the automatic operation mode, and then maintains the vehicle in the vehicle stop state, and a second brake device that slows down the vehicle, wherein before the second brake device starts slowing down the vehicle in the automatic operation mode, the controller shifts from the automatic operation mode to the manual operation mode upon a trigger of operation of any one of the steering operation member, the brake operation member, and the accelerating operation member, in a period after the second brake device starts slowing down the vehicle in the automatic operation mode and until the first brake device automatically starts working, the controller shifts from the automatic operation mode to the manual operation mode upon a trigger of operation of any one of the steering operation member and the accelerating operation member.

9. The self-driving vehicle according to claim 8, wherein in the period after the second brake device starts slowing down the vehicle in the automatic operation mode and until the first brake device automatically starts working, the controller does not shift from the automatic operation mode to the manual operation mode upon a trigger of operation of the brake operation member.

10. The self-driving vehicle according to claim 1, further comprising:

a steered wheel, wherein the steering operation member is interlocked with the steered wheel and is positioned at a rotation angle corresponding to orientation of the steered wheel, the controller controls the orientation of the steered wheel based on a relative position between the induction line and the vehicle in the automatic operation mode, and the controller limits change of the orientation of the steered wheel at a start time of running of the vehicle in the automatic operation mode.

11. The self-driving vehicle according to claim 10, wherein the controller determines the start time of running based on a speed of the vehicle.

12. The self-driving vehicle according to claim 10, further comprising:

a start instruction operation member for the driver to instruct the controller to start running the vehicle in the automatic operation mode, wherein the controller determines the start time of running based on operation of the start instruction operation member.

13. The self-driving vehicle according to claim 10, wherein in a vehicle running state in the automatic operation mode, the controller shifts from the automatic operation mode to the manual operation mode upon a trigger of operation of the steering operation member.

* * * * *